United States Patent

Suzuki et al.

[15] 3,688,301

[45] Aug. 29, 1972

[54] DIGITAL-ANALOG CONVERTING APPARATUS

[72] Inventors: Takashi Suzuki, Tokyo; Hikaru Furukawa, Tokyo, both of Japan

[73] Assignee: Takeda Riken Industry Company, Ltd., Tokyo, Japan

[22] Filed: Oct. 13, 1970

[21] Appl. No.: 80,429

[52] U.S. Cl...........................................340/347 DA

[51] Int. Cl...........................................H03k 13/247

[58] Field of Search.................340/347 AD, 347 DA

[56] References Cited

UNITED STATES PATENTS 3,522,598 8/1970 Sokolich............340/347 AD

*Primary Examiner*—Maynard R. Wilbur
*Assistant Examiner*—Jeremiah Glassman
*Attorney*—William J. Daniel

[57] ABSTRACT

This invention relates to a digital-analogue converting apparatus wherein an input winding in which the number of turns can be varied, an output winding, and a magnetic flux detecting winding are wound on a magnetic core. The input winding is connected with a constant current source through means for selecting the number of input turns according to a digital progression, and the output winding is connected with a variable current source through a standard resistance so that a direct current voltage corresponding to only the number of input turns representing a digital quantity may be obtained as output.

3 Claims, 3 Drawing Figures

DIGITAL-ANALOG CONVERTING APPARATUS

This invention relates to a digital-analogue converting apparatus for the purpose of obtaining a voltage comprising an analogue quantity corresponding to a digital quantity, there has been conventionally used a resistance potentiometer wherein a plurality of resistances are connected in series with a standard voltage source and an analog output voltage is taken from one of a series of tapes corresponding to a particular digital quantity to be converted. However, the precision available using such a circuit is limited by the influences of variations of the divided resistance with temperature and time, and by other variations such as the thermal electromotive force of the contact and the load resistance. Therefore, a digital-analogue conversion of high precision, such as an error of less than about 10 ppm. has not been realized. On the other hand, when the number of turns of a winding applied to a magnetic core of high magnetic permeability is selected to represent and to correspond to a digital quantity, and at the same time the electric current through another fixed winding is so adjusted that the direct current magnetic flux in the magnetic core will cancel, a digital-analogue conversion can be made. In such apparatus, the precision is determined only by the number of turns and is so stable as to be unlikely to fluctuate, and therefore a conversion of a high precision can be made. However, in prior-art circuits the operation is so complicated that the apparatus can not be used as a variable standard voltage source in a voltmeter or the like, and in addition the error based on variation in the load resistance has been unavoidable.

An object of the present invention is to provide a digital-analogue converting apparatus wherein a digital-analogue conversion can be made by any automatic operation and at the same time an error caused by changes in the load resistance can be compensated.

Figure 1:
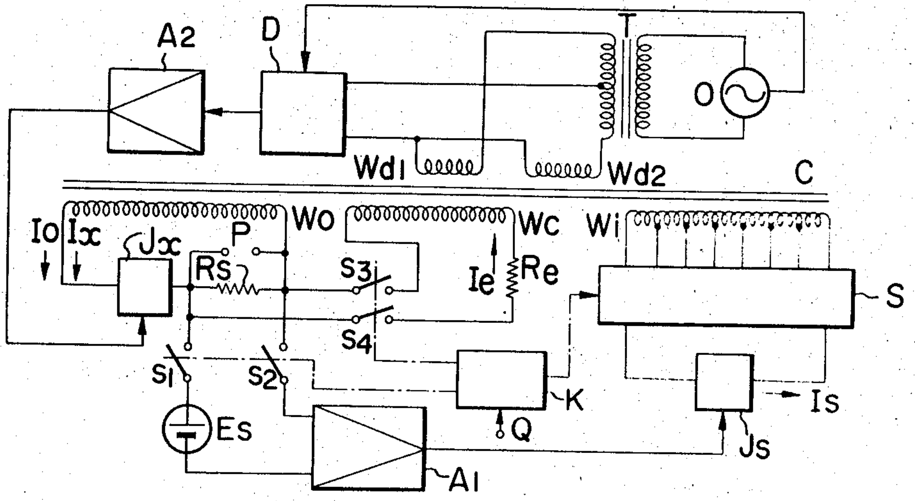
FIG. 1 is a circuit diagram of an embodiment of the present invention.

FIG. 1 is an embodiment of the present invention wherein there is wound on a magnetic core C of high magnetic permeability an input winding W*i* having many taps so that the number of turns can be digitally varied, an output winding W*o* having a fixed number of turns, a compensating winding W*c* of the same number of turns as the above mentioned output winding, and magnetic flux detecting windings W*d*1 and W*d*2. A constant current source J*s* is connected with the input winding W*i* through a switch S which selects the number of input turns by switching the taps. A variable current source J*x* and standard resistance R*s* are connected in series with the output winding W*o* and both ends of the resistance R*s* are connected with apparatus output terminals P. Also a standard voltage source E*s* and the input terminal of an amplifier A1 are connected in series between both ends of the standard resistance R*s* through relay contacts S1 and S2 so that the constant current source J*s* may be controlled by the output of said amplifier. Further, the detecting windings W*d*1 and W*d*2 are connected in series opposition and are coupled with an oscillator O through a transformer T. An output signal taken from the common junction of the windings W*d*1 and W*d*2 and from the neutral point of the transformer T is applied to a demodulator D. Whenever there is no direct current magnetic flux at all in the magnetic core C, the impedances of the windings W*d*1 and W*d*2 perfectly balance with respect to the output of the oscillator O and therefore no input is applied to the demodulator but, when there is a direct current magnetic flux in the core C, an unbalance is produced and a signal of a phase corresponding to the direction of the magnetic flux is applied to said demodulator. Therefore, if a demodulation is made with reference to the phase of the output of the oscillator O, a direct current output of a polarity corresponding to the direction of the magnetic flux is applied to the amplifier A2 from the demodulator D. The output current Ix from the variable current source J*x* is controlled with the output of the amplifier A2.

Figure 2:
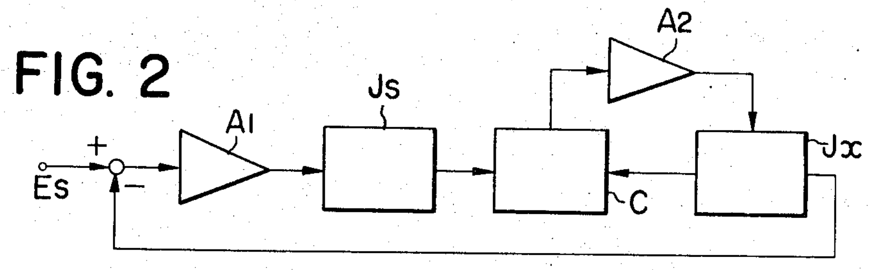
FIG. 2 is a view of an automatic control system of the apparatus in FIG. 1.

As an initial mode in the operation of this apparatus, the taps are switched by controlling the switch S with a controller K to set the number of turns N*s* of the input winding W*i* to be $10^n$ times as large as the voltage of the standard voltage source E*s* wherein n is a positive or negative digital integer, and at the same time the contacts S1 and S2 are closed. That is to say, the output direct currents of the constant current source J*s* and variable current source J*x* flow through the windings W*i* and W*o* and a resultant direct current magnetic flux is generated in the magnetic core C. Thereupon, an automatic control takes place as a result of the detecting windings W*d*1 and W*d*2 out signals to the demodulator D to control the variable current source J*x* to an output current value at which the magnetomotive forces of the windings W*i* and W*o* will cancel each other because the resultant value of the direct current magnetic flux of the magnetic core C will be zero. At the same time, an automatic control of the constant current source J*s* is also effected for the purpose of making the voltage drop produced in the standard resistance R*s* by the current flowing through said resistance equal and opposite to the voltage of the standard voltage source E*s* so that the input of the amplifier A1 will become zero. This automatic control system is shown by itself in FIG. 2. When the control operation is completed, the relationships $$I_o N_o = I_s N_s \ldots \quad (1)$$

$$I_o R_s = E_s \ldots \quad (2)$$

will hold for the particular numbers of turns N*s* and N*o* of the windings W*i* and W*o* and for the output currents I*s* and I*o* of the constant current source Js and variable current source J*x*, taken together with the particular standard resistance R*s* and standard voltage source E*s*.

Then, after the above initial mode has been completed, the apparatus will be operated in a second mode as follows. The switch S will be set in response to the input digital signal applied to the controller K from the terminal Q, and the number of turns of the winding w*i* is accordingly set at a new value N*x* corresponding to the input digital quantity and at the same time the contacts S1 and S2 are opened. Therefore, the output of the amplifier A1 zero and the constant current source J*s* will continue its output current at the level set above, the constant current $I_s$. However, as the variable current source $J_x$ is controlled by the output signals of the detecting windings $W_{d1}$ and $W_{d2}$ so that the magnetic flux of the magnetic core C approaches zero, if the output current of the current source $J_x$ reaches a new value $I_x$ and the voltage drop across the resistance $R_s$ becomes $E_x$ then, $$I_x N_o = I_s N_x \ldots \quad (3)$$

$$I_x R_s = E_x \ldots \quad (4)$$

hold. From the above mentioned formulas (1) to (4), $$E_x = E_s/N_s\, N_x \quad (5)$$

is obtained. The quantities Es and Ns refer to the voltage across the standard register $R_s$ and to the selected number of turns of the input winding $W_i$ during the previously discussed initial mode, whereas the quantities $E_x$ and Nx refer to the corresponding voltage and number of turns during the present operation of the apparatus during which the conversion from digital to analog is performed. As the number of turns Ns was initially set to be $10^n$ times as large as the standard voltage $E_s$ which then appeared across the resister $R_s$ as described above, the voltage $E_x$ now appearing across $R_s$ corresponds directly to the input digital quantity introduced in the present mode at the terminal Q. Therefore, a digital-analogue conversion has been performed and appears as the voltage Ex out of the output terminal P.

Further, in the above described apparatus, an error is likely to be produced by variation or fluctuation of the external load resistance connected with the terminal P in the above described apparatus. The compensating winding $W_c$ is used to compensate such error and is connected in series with any external load resistance $R_e$ and across the to both ends of the standard resistance Rs through contacts S3 and S4. The compensating winding $W_c$ has the same number of turns as of the output winding Wo and a load current $I_e$ flows through it with such polarity as generates a magnetic flux opposed to said winding Wo in the magnetic core C. Further, the resistance of the winding $W_c$ is made very small so that it can be considered negligible as compared with the resistance Re. After the above described conversion operation is completed, during which the contacts S3 and S4 are closed by the controller K the same voltage as the voltage drop across the standard resistance $R_s$ is applied to the load resistance $R_e$. However, the current which formerly would have flowed only through the resistance $R_s$ now divides and also flows through the load resistance $R_e$ and causes the voltage drop across the standard resistance $R_s$ to change. At the same time, the load current $I_e$ flows also through the winding $W_c$ to generate a direct current magnetic flux in the magnetic core C. The detecting windings $W_{d1}$ and $W_{d2}$ detect this magnetic flux and control the variable current source $J_x$ so that said magnetic flux will be cancelled. Therefore, the current of the output winding $W_o$ increases by the load current $I_e$ and compensates the change of the voltage drop across standard resistance $R_s$.

Figure 3:
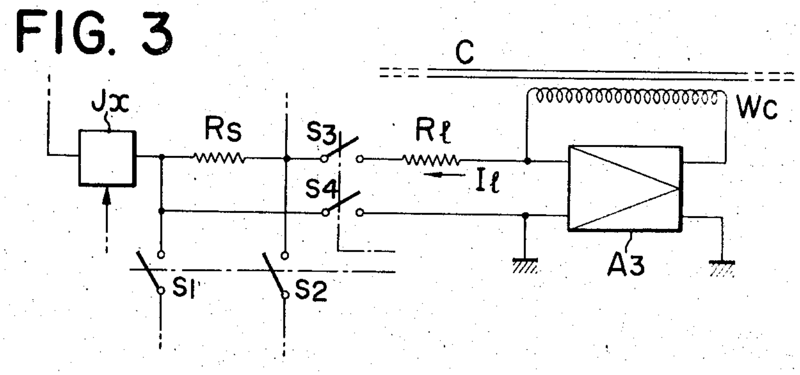
FIG. 3 is a partial circuit diagram of another embodiment of the present invention.

By the way, in the above described explanation, the resistance of the compensating winding $W_c$ is neglected. However, the voltage across the load resistance $R_e$ is reduced by an amount equal to the voltage drop across this winding and produces an error. The circuit according to FIG. 3 is to eliminate also this error, and it shows some of the same parts with the same corresponding reference characters as in FIG. 1. In this embodiment an operational amplifier A3 using the compensating winding Wc as a feedback resistance is provided, and a load resistance $R_e$ and an input terminal of the amplifier A3 are connected in series through contacts S3 and S4 between both ends of a standard resistance $R_s$. Therefore, if the same current as the current $I_e$ of the load resistance $R_e$ flows through the compensating winding Wc and the amplification factor of the amplifier A3 is $\alpha$, the input resistance of said amplifier becomes $1/\alpha$ multiplied by the resistance of the winding Wc. Therefore, by making the amplification factor $\alpha$ large enough, the resistance of the winding $W_c$ can be neglected.

As explained in the above with reference to the first embodiment, in the apparatus of the present invention a direct current voltage corresponding only to the number of turns of the input winding and representing a digital quantity can be obtained. The number of turns is not likely to fluctuate with temperature and time and therefore a digital-analogue conversion of a very high precision can be made. Further, as the apparatus is controlled by a double automatic control system, it requires no complicated operation, can be incorporated as a variable standard current source, for instance for a digital voltmeter and has such very excellent operation and effect that it can reject also errors caused by the fluctuation of the load resistance.

What is claimed is:

1. Digital-analogue converting apparatus comprising, a magnetic core, an input winding on said core and having a plurality of taps by which its number of turns can be varied, an output winding on the core and having a fixed number of turns, means for detecting magnetic flux in the core, a constant current source whose output current can be set, tap selecting means connected to couple said constant current source to selected turns of the input winding, a variable current source and a fixed standard resistance connected in series with the output winding, control means operative in response to the flux detecting means to vary the variable current source to cancel the flux in the core, an amplifier having an input and having an output connected to set the level of the constant current source, a standard voltage source, controller means operative in a first mode to actuate the tap selecting means to select a tap representative of a digital quantity corresponding with the analogue level of said standard voltage source and also operative in that mode to connect the standard voltage source and the standard resistance in series with the amplifier input with such polarity as to make the voltage across the standard resistance cancel the voltage of the standard voltage source at the amplifier input when the resultant flux in the core equals zero, and said controller means being operative in a second mode to disconnect said standard voltage source and amplifier and also to actuate the tap selecting means to select another tap corresponding with another digital quantity to be converted to an analogue quantity which then appears across said standard resister as the output of the apparatus.

2. Digital-analogue converting apparatus as set forth in claim 1, including a load resistance, and including a compensating winding on the core having the same number of turns as said output winding, the load resistance and the compensating winding being connected in series with each other and across said standard resistance.

3. Digital-analogue converting apparatus as set forth in claim 1, including a load resistance, a compensating winding on the core having the same number of turns as said output winding, and an operational amplifier having input terminals and having an output terminal, said compensating winding being connected across the amplifier as feedback between the output terminal and an input terminal, and the load resistance and the input terminals being connected in series with each other and across said standard resistance.

* * * * *